United States Patent Office 3,519,586
Patented July 7, 1970

3,519,586
BLENDS OF WAXES AND CRYSTALLINE CO-
POLYMERS OF BUTENE-1 AND PROPYLENE
OR ETHYLENE
James E. Guillet, Toronto, Ontario, Canada, and Robert
L. Combs, Kingsport, Tenn., assignors to Eastman
Kodak Company, Rochester, N.Y., a corporation of
New Jersey
No Drawing. Filed Oct. 12, 1967, Ser. No. 674,756
Int. Cl. C08f 45/52
U.S. Cl. 260—28.5      9 Claims

ABSTRACT OF THE DISCLOSURE

Hydrocarbon or other waxes are blended with crystalline block copolymers of butene-1 and propylene or ethylene, propylene being preferred, to give coating compositions which may be applied by hot-melt coating methods. The composition may contain varying proportions of the copolymer, for example between about 1% and about 50% by weight of the total blended resins. In the copolymer, varying ratios of butene-1, ethylene, and/or propylene are useful. For example between about 20% and about 95% of butene-1 units may be present in the polymer. Homopolymers of ethylene or propylene are not suitable in modifying the waxes, and the copolymers described in the specification are, surprisingly superior to butene-1 crystalline homopolymers. The compositions have a low cloud point, high strength, are highly cohesive, have low melt viscosities, provide hard tough waterproof protective coatings or laminations and are excellent for impregnating paper, fabrics, plastic films and the like. The coating methods include curtain, dip, spray, extrusion, and aqueous emulsions of the modified wax composition.

---

This invention relates to compositions of natural or paraffin waxes modified with particular crystalline or stereo-regular block copolymers of butene-1 and propylene or ethylene, or combinations thereof. Particularly beneficial results are obtained in copolymers containing between about 20% and about 95% butene-1 units by weight, the remainder being propylene units, and in which the crystalline copolymer is present in the compositions in an amount of at least about 1% by weight.

Petroleum waxes such as paraffin wax and microcrystalline wax, and natural waxes such as carnauba, beeswax, and montan wax are, to varying degrees, soft and brittle. It has been proposed in the past to incorporate polyolefins into such waxes to improve the properties thereof. One of the major disadvantages of such additives is that most polyolefins are basically incompatible with such waxes, thus limiting the amount of polymer to very small quantities which are insufficient to substantially modify the properties of the wax. Low molecular weight polyolefins are more compatible, but have not greatly improved the properties over those of the wax alone. Crystalline polybutene-1 has been found to be compatible with waxes in large proportions, but in utilizing homopolybutene-1, it has been found that the coating is quite tacky, requiring low coating speeds to prevent sticking of the coated product to the coating machinery. A further disadvantage of the utilization of a crystalline homopolymer of butene-1 is that there is a marked tendency of the coated product to curl. In fact, curling may be so bad that paper coated with the polybutene-1 has less than 50% contact with a flat surface.

Accordingly, it is an object of the present invention to provide a wax composition which is free of the foregoing disadvantages and defects.

Another object of the invention is to provide a natural or hydrocarbon wax composition containing up to about 50% of a crystalline or stereo-regular block copolymer of butene-1 and ethylene and/or propylene, said copolymer containing between about 20% and about 95% by weight of butene-1 units, to achieve the foregoing objective.

Yet a further object is to so control the inherent viscosity and molecular weight of the copolymer that improved properties are achieved. The modes of accomplishing the foregoing and other objects will become apparent from a consideration of the following.

Paraffin wax is of primary interest according to the invention, but other petroleum waxes such as microcrystalline wax, and others such as montan, carnauba and beeswax are also improved by addition of the stereo-regular copolymers of the invention.

The crystalline block copolymers are prepared by methods known to the art, for example for butylene and propylene by block formation techniques employing such stereo-specific catalysts as lithium aluminum hydride and $TiCl_3$, preferably with a third component in the high temperature solution process, or ethyl aluminum sesquichloride, hexamethyl phosphoramide and $TiCl_3$ in the low temperature slurry process. For example, the polymerization may take place in a continuous two stage reactor system. In the first stirred tubular reactor the feed is liquid butene-1 and the catalyst is ethyl aluminum sesquichloride, hexamethyl phosphoramide and titanium trichloride at a 2/1/3 molar ratio. The catalyst, suspended in xylene, is fed to the liquid butene-1 and the polymerization is carried out at about 90° C. and about 770 p.s.i.g. using 100 p.p.m. of hydrogen to control inherent viscosity. Conversion in the first stage is about 25 to 30% at a catalyst concentration of about 0.2%.

The polymer slurry from the first stage is fed to the second stage tubular reactor, 10 weight percent of propylene is added and the polymerization is continued at about 80° C. and 860 p.s.i.g. The polymer is then worked up in a known manner, the solid polymer being separated from the liquid portion of the slurry, the olefins then being flashed off and the polymer then being washed with hot isobutanol to remove catalyst.

In another suitable method, 0.06 gram of $LiAlH_4$ (.0158 mole) and 2.46 grams of $TiCl_3$ (.0158 mole) are slurried in 900 ml. of mineral spirits and the slurry is charged to a two liter stirred autoclave. The polymerization is carried out by introducing butene-1 at a pressure of about 800 p.s.i.g. and in a period of about 15 minutes raising the temperature from 133° C. to about 160° C. with the pressure increasing to about 1700 pounds per square inch and with the temperature increasing slightly more to about 165° C. and the pressure being reduced. At about 160° C. and 900 p.s.i.g. ethylene is introduced with the temperature being kept at above about 150° C. for about 2 hours. The overall reaction requires about 3 hours. The polymer contains a small proportion of gross polymer, the bulk of the same being crystalline. If desired the noncrystalline polymer may be extracted with boiling hexane. Such polymerization methods of preparing crystalline block copolymers are described in Hagemeyer et al. Belgian Pats. 624,652 and 624,653.

Suitable crystalline block copolymers of butene-1 and propylene or ethylene, or both are as follows:

Inherent viscosity—0.6 to 4.0
Melting point—110° C. to 140° C.
Butene content—20% to 95%

The preferred copolymer consists of butene-1 and propylene units and has the following properties:

TABLE I

| Example | Additive | Inherent viscosity of additive | Concentration of additive, percent | Cloud point, °F. | Tensile strength, p.s.i. | Adhesion, lbs./in.² * |
|---|---|---|---|---|---|---|
| 1 | Control | | | 130 | 180 | 4 |
| 2 | Polypropylene | 0.7 | 2 | 230 | 150 | 4 |
| 3 | Polyethylene | 0.7 | 2 | 200 | 200 | 5 |
| 4 | Poly-1-butene | 1.2 | 20 | 200 | 680 | 17 |
| 5 | 5% butene-propylene copolymer | 2.8 | 2 | 300 | 195 | 4 |
| 6 | do | 2.8 | 20 | 300 | 301 | 6 |
| 7 | 20% butene-propylene copolymer | 3.2 | 2 | 181 | 242 | 7 |
| 8 | do | 3.2 | 20 | 250 | 568 | 14 |
| 9 | 50% butene-propylene copolymer | 2.2 | 2 | 163 | 258 | 7 |
| 10 | do | 2.2 | 20 | 221 | 644 | 16 |

*Adhesion is measured in an Instron tester after the molten wax is poured into a brass cylinder resting on the paper and after this specimen is allowed to cool for 3 hrs. at room temperature.

Inherent viscosity—0.8 to 3.2
Melting point—110° C. to 135° C.

For best cloud point and tack properties the copolymer has between 50% and 95% butene-1 units. As regards best strength properties, the butene content is between about 20% and about 50%. The preferred butene-1 content thus depends on the desired properties. When the block copolymer contains less than about 20% butene units, it is not compatible enough with wax to be useful.

One of the more suitable methods of blending the copolymer and wax is to simply melt a mixture thereof.

Surprisingly, the low-melt viscosity of the wax-copolymer blend permits dip-coating and hot-melt coating of materials in contrast with materials such as low molecular weight polyethylene which has a high melt-viscosity requiring the more intricate extrusion methods of coating. Also, the cloud point of the wax-copolymer blend is sufficiently low that the melt may be utilized at only moderately higher temperatures than for wax alone. Cloud point is the point at which, upon decreasing the temperature of a melt, the melt becomes cloudy. This is one reason that material such as polypropylene and polyethylene, even though of low molecular weight, are unsatisfactory, having cloud points greatly in excess of 300° F. at moderately high concentrations. When used in sufficiently small quantities to have a lower cloud point, the desired improvements in physical properties is not obtained.

The inherent viscosity given above are highly desirable in that if the inherent viscosity and molecular weight are too low, the properties of the wax are not improved. Similarly, if the inherent viscosity is too high, the cloud point is increased to a value at which excessively high temperatures must be used. The wax compositions of the invention have a low cloud point, high strength, are highly cohesive, have low melt viscosities, provide hard tough waterproof protective coatings or laminations, and are excellent for impregnating paper, fabrics, plastic films and the like. The coating method is not limited to hot-melt although that is one of the faster and simpler methods, but includes the use of dip, spray, or extrusion methods. Aqueous emulsions of the modified wax composition are particularly easy to apply by a variety of methods. A particularly valuable use of the present compositions is in coatings for paper containers such as milk cartons.

In the following examples, all of the polyyolefins were crystalline products containing at least 85% crystalline poly-alpha-olefin. The wax and additive in each case were blended by melting and stirring the two materials. These examples are given to show suitable modes of carrying out the invention and it is not intended that the invention be limited thereto unless otherwise so specified.

Table 2 illustrates the advantages of the invention in regard to tackiness of the compositions subsequent to coating the substrate or the laminating materials, and to non-warping of the coated material. A possible reason is that the homopolymer may pass through a Form II crystallinity before it reaches the more stable Form I crystallinity, particularly when it is quenched rapidly. No Form II crystallinity has been observed with the copolymers of the invention. The importance of the tackiness is that the copolymer wax blend can be coated at least three times the speed of the homopolymer product, providing for much greater output per unit of time per machine. The properties of tack and warpage for certain of the foregoing examples is as follows:

TABLE 2.—PARAFFIN WAX BLEND PROPERTIES OF 1-BUTENE COPOLYMERS (20% COPOLYMER IN WAX) COMPARED TO THE HOMOPOLYMERS

| Example | Polymer | Delayed tack time, sec.¹ | Warpage |
|---|---|---|---|
| 1 | Wax control | 5 | None |
| 4 (table 1) | Poly-1-butene | 60 | Yes |
| 6 (table 1) | 5/95 1-butene/propylene copolymer | (³) | (³) |
| 8 (table 1) | 20/80 1-butene/propylene copolymer | 5 | None |
| 10 (Table 1) | 50/50 1-butene/propylene copolymer | 15 | None |
| 11 | 80/20 1-butene/propylene copolymer | 20 | None |
| 12 | Polypropylene | (³) | (³) |

¹ Time that the polymer blend surface remains sticky after solidification of the coating from the melt.
² Warpage is observed on a 1-mil coating on a 3 x 3 x 0.0035 in. piece of paper. Warpage is said to have occurred if there is any curling or distortion of the composition so that it will not lay flat on a flat surface.
³ Not compatible enough to make a coating and perform tests.

The invention has been described in detail with particular reference to preferred embodiments thereof, but it will be understood that variations and modifications can be effected within the spirit and scope of the invention as described hereinabove and as defined in the appended claims.

We claim:
1. A low cloud point, high strength, highly cohesive, hard, low melt viscosity wax composition containing wax homogeneously admixed with a crystalline block copolymer of butene-1 with ethylene, propylene or admixtures thereof, said polymer having an inherent viscosity of between about 0.6 and about 4.0 and having between about 20% and about 95% butene-1 units, by weight.

2. The composition of claim 1 in which said copolymer consists of butene-1 and propylene units and is present in said composition in an amount of between about 1% and about 50% by weight of the solid ingredients, and said wax is a petroleum wax.

3. The composition of claim 2 comprising paraffin wax, and in which said copolymer has an inherent viscosity of between 0.8 and 3.2 and a melting point of 110° C. to 140° C.

4. The composition of claim 3 in which said inherent viscosity is below about 2.0.

5. An aqueous wax emulsion comprising the composition of claim 1.

6. An article of manufacture comprising a substrate having a coating on a surface thereof of the composition of claim 1.

7. The article of claim 6 in the form of a container, and in which the substrate is of cellulose fibers.

8. In a method of coating a substrate with a composition comprising wax, the improvement of applying the composition of claim 1 by a kiss coating method.

9. The method of claim 8 in which said substrate is of cellulose fibers, and the coated substrate is formed into a container.

References Cited

UNITED STATES PATENTS

| | | |
|---|---|---|
| 3,254,140 | 5/1966 | Hagemeyer. |
| 3,326,834 | 6/1967 | Signorelli. |
| 3,338,855 | 8/1967 | Kray. |

MORRIS LIEBMAN, Primary Examiner

P. R. MICHL, Assistant Examiner